US012441100B2

(12) United States Patent
Katsuda et al.

(10) Patent No.: US 12,441,100 B2
(45) Date of Patent: Oct. 14, 2025

(54) LIQUID EJECTING APPARATUS

(71) Applicant: SEIKO EPSON CORPORATION, Tokyo (JP)

(72) Inventors: Osamu Katsuda, Matsumoto (JP); Hideki Okada, Shiojiri (JP); Hirokazu Sekino, Chino (JP)

(73) Assignee: SEIKO EPSON CORPORATION (JP)

( * ) Notice: Subject to any disclaimer, the term of this patent is extended or adjusted under 35 U.S.C. 154(b) by 19 days.

(21) Appl. No.: 18/494,890

(22) Filed: Oct. 26, 2023

(65) Prior Publication Data

US 2024/0140085 A1 May 2, 2024

(30) Foreign Application Priority Data

Oct. 27, 2022 (JP) ................................ 2022-172014

(51) Int. Cl.
*B41J 2/045* (2006.01)

(52) U.S. Cl.
CPC ....... *B41J 2/04503* (2013.01); *B41J 2/04505* (2013.01)

(58) Field of Classification Search
CPC .. B41J 2/04503; B41J 2/04505; B41J 3/4078; B41J 2/04526; B41J 2/02; B41J 2/04535; B41J 2/04556; B41J 2/04558; B41J 2/0456; B41J 2/04561; B41J 2/085
See application file for complete search history.

(56) References Cited

U.S. PATENT DOCUMENTS

2023/0382451 A1* 11/2023 Knaub .............. B62D 15/0285

FOREIGN PATENT DOCUMENTS

EP 0081134 A1 6/1983
JP S58-098485 A 6/1983

* cited by examiner

*Primary Examiner* — Kristal Feggins
(74) *Attorney, Agent, or Firm* — Harness, Dickey & Pierce, P.L.C.

(57) ABSTRACT

A liquid ejecting apparatus includes: a conveyer configured to convey a medium in a conveyance direction; a carriage configured to move in a reciprocating direction intersecting the conveyance direction at a position facing the medium conveyed in the conveyance direction; and a head provided on the carriage and including at least one nozzle configured to eject liquid to the medium, in which the head ejects the liquid in a continuous flow, converts the continuous flow into a plurality of droplets and causes the a plurality of droplets to collide with the medium.

10 Claims, 19 Drawing Sheets

LIQUID EJECTING APPARATUS

The present application is based on, and claims priority from JP Application Serial Number 2022-172014, filed Oct. 27, 2022, the disclosure of which is hereby incorporated by reference herein in its entirety.

BACKGROUND

1. Technical Field

The present disclosure relates to a liquid ejecting apparatus.

2. Related Art

In related art, various types of liquid ejecting apparatus for ejecting liquid to an object are used. Among such types of liquid ejecting apparatus, there is a liquid ejecting apparatus that ejects liquid to a medium such as fabric. For example, JP-A-58-98485 (PTL 1) discloses a spray nozzle that includes a liquid spray head and applies liquid to a spun object while rotating the liquid spray head at a high speed.

However, in the liquid ejecting apparatus in the related art which ejects the liquid to the medium such as fabric as disclosed in PTL 1, it is difficult to uniformly eject a small amount of liquid to the medium. In the liquid ejecting apparatus in the related art, it is difficult to form small droplets by a device including a single fluid nozzle that uses only one fluid (liquid to be ejected) when ejecting the liquid, and it is difficult to uniformly eject the liquid to a medium, whereas a device including a two-fluid nozzle that uses two fluids (air or the like in addition to the liquid to be ejected) tends to consume a large amount of liquid since a large amount of mist is generated along with ejection of the liquid.

SUMMARY

A liquid ejecting apparatus according to an aspect of the present disclosure for solving the above problem includes: a conveyer configured to convey a medium in a conveyance direction; a carriage configured to move in a reciprocating direction intersecting the conveyance direction at a position facing the medium conveyed in the conveyance direction; and a head provided on the carriage and including at least one nozzle configured to eject liquid to the medium, in which the head ejects the liquid in a continuous flow, converts the continuous flow into droplets and causes the continuous flow to collide with the medium in a form of droplets.

DESCRIPTION OF EMBODIMENTS

Figure 1:
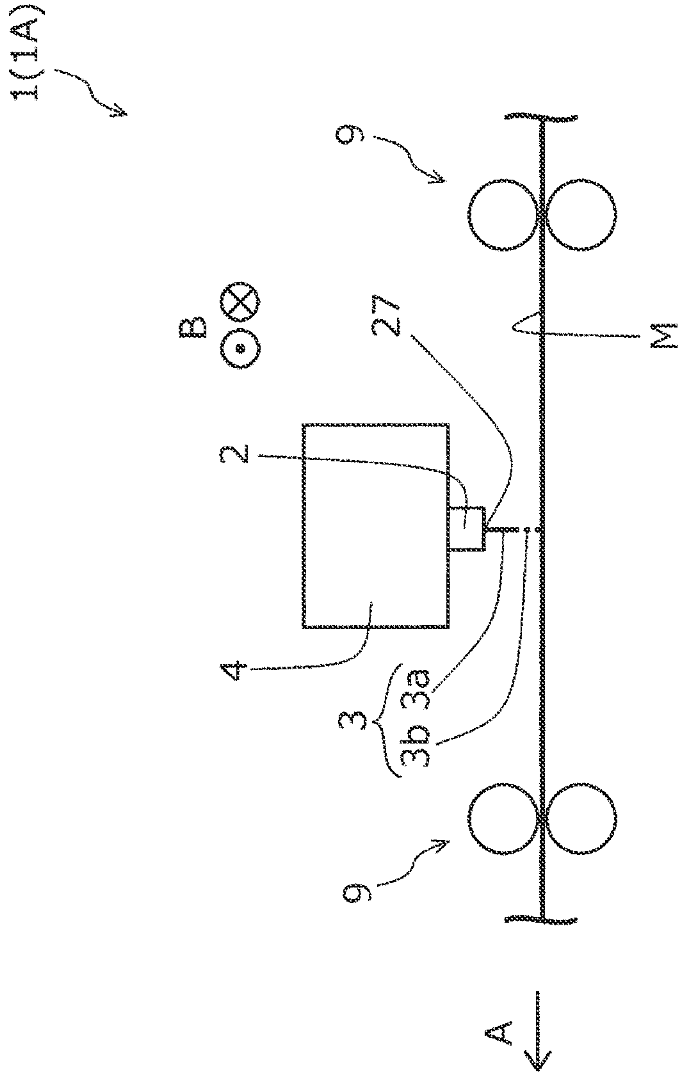
FIG. 1 is a schematic side view showing a liquid ejecting apparatus according to a first embodiment.

First, the present disclosure will be schematically described.

A liquid ejecting apparatus according to a first aspect of the present disclosure for solving the above problem includes: a conveyer configured to convey a medium in a conveyance direction; a carriage configured to move in a reciprocating direction intersecting the conveyance direction at a position facing the medium conveyed in the conveyance direction; and a head provided on the carriage and including at least one nozzle configured to eject liquid to the medium, in which the head ejects the liquid in a continuous flow, converts the continuous flow into droplets and causes the continuous flow to collide with the medium in a form of droplets.

According to this aspect, the head ejects the liquid in a continuous flow, converts the continuous flow into droplets, and causes the continuous flow to collide with the medium in a form of droplets. With such a configuration, it is possible to apply the liquid to a desired position on the medium with high energy and high accuracy while reducing mist or the like. Therefore, a small amount of the liquid can be uniformly ejected to the medium.

The liquid ejecting apparatus according to a second aspect of the present disclosure is directed to the first aspect and further includes: a liquid storage configured to store the liquid and a liquid sending portion configured to send the liquid from the liquid storage to the head.

According to this aspect, the liquid storage configured to store the liquid and the liquid sending portion configured to send the liquid from the liquid storage to the head are provided. Therefore, the liquid can be applied to the medium with particularly high energy by the liquid sending portion.

The liquid ejecting apparatus according to a third aspect of the present disclosure is directed to the first or second aspect, in which the carriage is moved in the reciprocating direction relative to the medium conveyed by the conveyer while the liquid is ejected from the head to the medium.

According to this aspect, the carriage can be moved in the reciprocating direction relative to the medium conveyed by the conveyer while the liquid is ejected from the head to the medium. Therefore, the liquid can be efficiently applied to the medium in a short time.

The liquid ejecting apparatus according to a fourth aspect of the present disclosure is directed to the first or second aspect, the conveyer is configured to intermittently convey the medium by repeating conveyance and stop of the medium, and the carriage is moved in the reciprocating direction while the liquid is ejected from the head to the medium during stop of intermittent conveyance of the medium.

According to this aspect, the conveyer can intermittently convey the medium and the carriage can be moved in the reciprocating direction while the liquid is ejected from the head to the medium during stop of intermittent conveyance of the medium. With such a configuration, the liquid can be ejected to the stopped medium, thus ejection accuracy of the liquid can be improved, and the liquid can be particularly uniformly applied to the medium.

The liquid ejecting apparatus according to a fifth aspect of the present disclosure is directed to the first or second aspect and further includes: a carriage moving shaft configured to move the carriage along the conveyance direction, and the carriage is configured to be movable in the reciprocating direction together with the carriage moving shaft.

According to this aspect, the carriage moving shaft configured to move the carriage along the conveyance direction is provided, and the carriage is configured to be movable in the reciprocating direction together with the carriage moving shaft. With such a configuration, the liquid can be ejected to the medium from various dispositions, and the liquid can be particularly uniformly applied to the medium.

The liquid ejecting apparatus according to a sixth aspect of the present disclosure is directed to the first or second aspect, in which the head includes a nozzle row in which a plurality of the nozzles are arranged along the conveyance direction.

According to this aspect, the head includes the nozzle row in which the plurality of nozzles are arranged along the conveyance direction. Therefore, the liquid can be efficiently applied to the medium.

The liquid ejecting apparatus according to a seventh aspect of the present disclosure is directed to the sixth aspect, in which the carriage is moved in the reciprocating direction relative to the medium conveyed by the conveyer while the liquid is ejected from the head to the medium, and a length-before-contact of the liquid ejected from the nozzle row in the conveyance direction is larger than a conveyance distance in the conveyance direction of the medium that is conveyed along with one movement of the carriage in the reciprocating direction.

According to this aspect, the length-before-contact of the liquid in the conveyance direction is larger than the conveyance distance in the conveyance direction of the medium that is conveyed along with one movement of the carriage in the reciprocating direction. Therefore, since the amount of movement of the medium conveyed by the conveyer is larger than the length-before-contact of the liquid, it is possible to inhibit generation of a portion where the liquid is not applied between a range of application by a movement of the carriage in a forward direction and a range of application by a movement in a backward direction.

The liquid ejecting apparatus according to an eighth aspect of the present disclosure is directed to the first or second aspect, in which the plurality of nozzles are disposed in a circular shape in the head.

According to this aspect, the plurality of nozzles are disposed in a circular shape in the head. Therefore, the liquid can be efficiently applied to the medium.

The liquid ejecting apparatus according to a ninth aspect of the present disclosure is directed to the first or second aspect, in which an inner diameter of the nozzle is 150 μm or less.

According to this aspect, the inner diameter of the nozzle is 150 μm or less. With such a configuration, the liquid can be densely applied to the medium.

The liquid ejecting apparatus according to a tenth aspect of the present disclosure is directed to the first or second aspect, in which an ejection speed of the liquid from the head is 10 m/s or more.

According to this aspect, the ejection speed of the liquid from the head is 10 m/s or more. With this configuration, the liquid can collide with the medium with high straightness, and the liquid can be applied with high accuracy to a desired position on the medium.

First Embodiment

Hereinafter, embodiments of a liquid ejecting apparatus 1 according to the present disclosure will be described with reference to the accompanying drawings. First, an overview of a liquid ejecting apparatus 1A according to a first embodiment of the present disclosure will be described with reference to FIG. 1. As shown in FIG. 1, the liquid ejecting apparatus 1A according to the present embodiment includes a conveyer 9 that conveys a medium M such as fabric in a conveyance direction A. The conveyer 9 in the present embodiment is a roller pair provided at at least two locations. However, a configuration and the number of the conveyer 9 are not particularly limited. For example, the medium M may be a tray on which clothes such as a T-shirt are placed and conveyed.

As shown in FIG. 1, the liquid ejecting apparatus 1A according to the present embodiment includes a carriage 4 that moves in a reciprocating direction B intersecting the conveyance direction A at a position facing the medium M conveyed in the conveyance direction A. The carriage 4 is provided with a head 2 including at least one nozzle 27 that ejects liquid 3 toward the medium M.

Here, the liquid ejecting apparatus 1A according to the present embodiment is configured such that an inkjet printer or the like can be coupled upstream of the liquid ejecting apparatus 1A in the conveyance direction A. When an inkjet printer or the like is coupled upstream of the liquid ejecting apparatus 1A in the conveyance direction A, a solution containing, for example, a water repellent, an insecticide, a fungicide, or a fire retardant can be used as the liquid 3. However, in the liquid ejecting apparatus 1A according to the present embodiment, even when no inkjet printer or the like is coupled upstream of the liquid ejecting apparatus 1A in the conveyance direction A, the liquid 3 containing, for example, a water repellent, an insecticide, a fungicide, or a fire retardant can be ejected to the medium M on which an image is formed by an inkjet printer or the like.

On the other hand, the liquid ejecting apparatus 1A according to the present embodiment is configured such that an inkjet printer or the like can be coupled downstream of the liquid ejecting apparatus 1A in the conveyance direction A. When an inkjet printer or the like is coupled downstream of the liquid ejecting apparatus 1A in the conveyance direction A, for example, a solution containing a pretreatment agent for improving ink color development can be used as the liquid 3. However, in the liquid ejecting apparatus 1A according to the present embodiment, even when no inkjet printer or the like is coupled downstream of the liquid ejecting apparatus 1A in the conveyance direction A, the liquid 3 containing, for example, a pretreatment agent can be ejected to the medium M on which an image is formed by an inkjet printer or the like.

Figure 2:
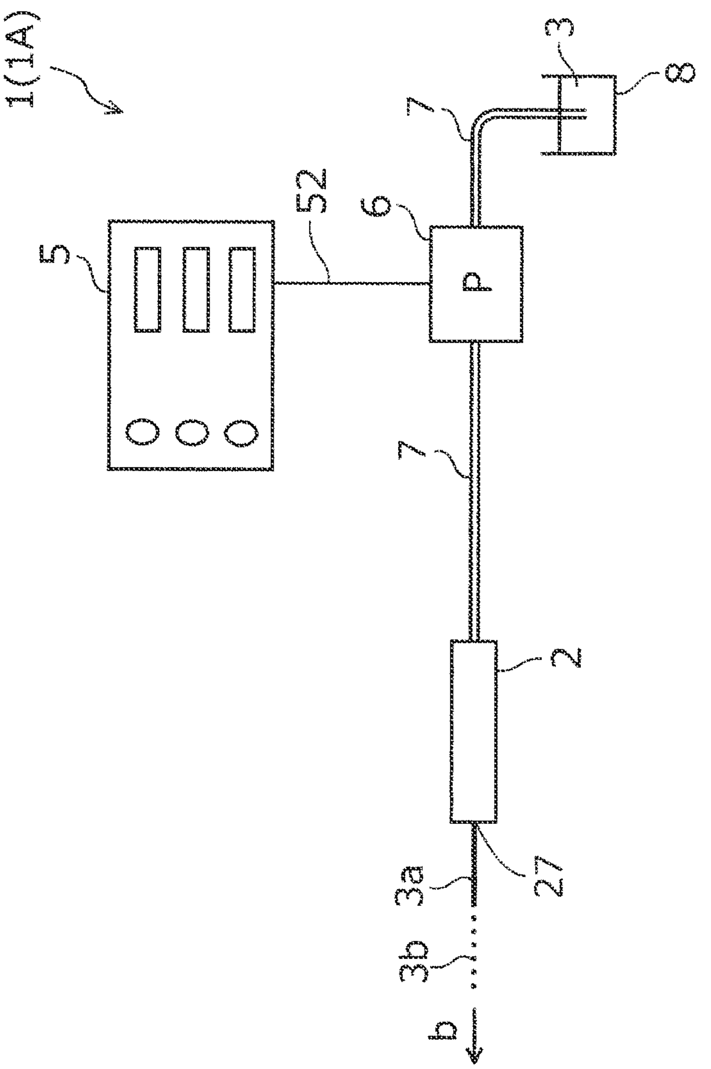
FIG. 2 is a schematic diagram showing a liquid supply path of the liquid ejecting apparatus in FIG. 1.

Next, a liquid supply path and the like of the liquid ejecting apparatus 1A in FIG. 1 will be described with reference to FIG. 2. As shown in FIG. 2, the liquid ejecting apparatus 1A according to the present embodiment includes the head 2 including the nozzle 27, a liquid storage 8 that stores the liquid 3 to be ejected, a liquid conveyance pipe 7 that couples the head 2 to the liquid storage 8, a liquid sending portion 6 that is a pump P, and a control unit 5 including a control signal line 52 to the liquid sending portion 6. The control unit 5 controls the entire liquid ejecting apparatus 1A according to the present embodiment. In addition, the head 2 is mounted on the carriage 4 as described above.

Here, the liquid ejecting apparatus 1A according to the present embodiment is a liquid ejecting apparatus that causes droplets 3*b* to collide with the medium M in a state in which a continuous flow 3*a* of the liquid 3 ejected in a continuous state in a direction b from one or a plurality of the nozzles 27 provided on the head 2 is converted into the droplets 3*b*. With such a configuration, the liquid ejecting apparatus 1A according to the present embodiment can apply the liquid 3 to a desired position on the medium M with high energy and high accuracy while reducing mist or the like. Therefore, a small amount of the liquid 3 can be uniformly ejected to the medium M.

As described above, the liquid ejecting apparatus 1A according to the present embodiment includes the liquid storage 8 which stores the liquid 3 and the liquid sending portion 6 which sends the liquid 3 from the liquid storage 8 to the head 2. Therefore, the liquid ejecting apparatus 1A according to the present embodiment can apply the liquid 3 to the medium M with particularly high energy by the liquid sending portion 6 such as the pump P.

Figure 3:
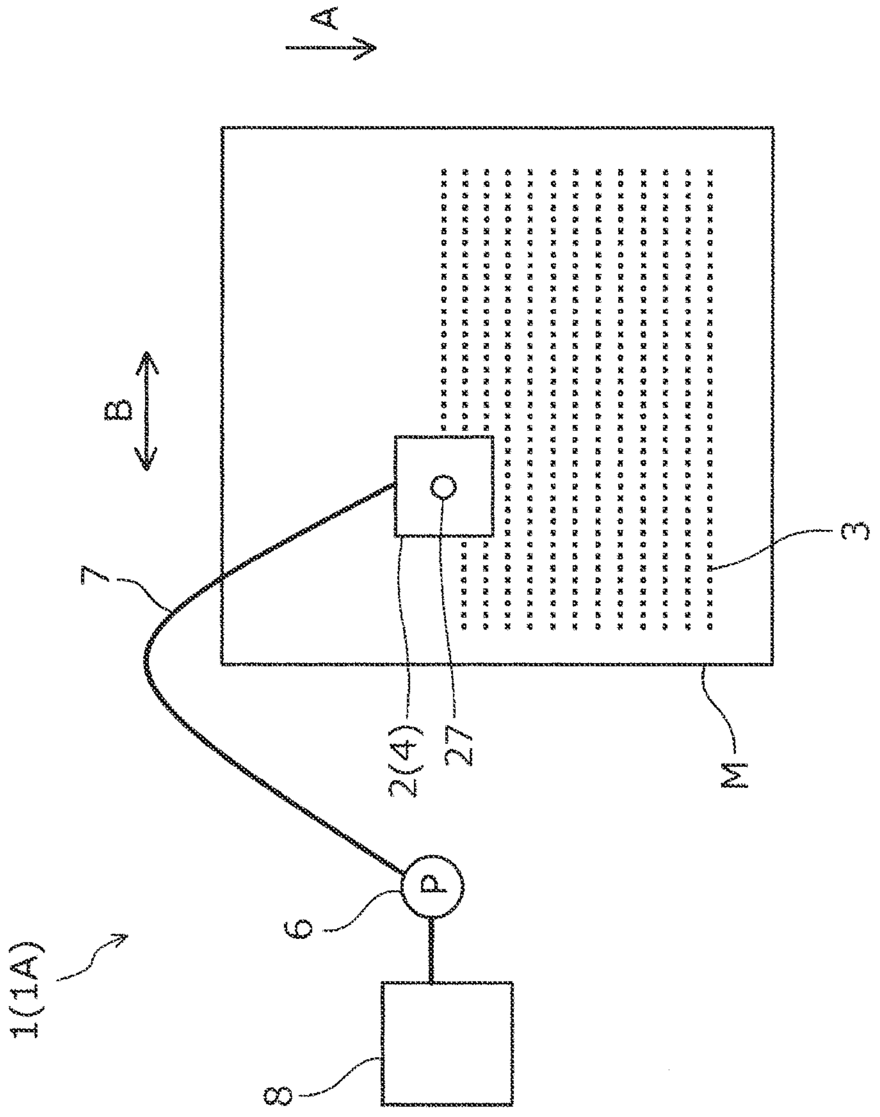
FIG. 3 is a schematic plan view showing a state in which liquid is ejected to a medium conveyed using the liquid ejecting apparatus in FIG. 1.

Next, a state in which the liquid 3 is ejected to the medium M conveyed using the liquid ejecting apparatus 1A in FIG. 1 will be described with reference to FIG. 3. As described above, the liquid ejecting apparatus 1A according to the present embodiment includes the conveyer 9. Here, the conveyer 9 can intermittently convey the medium M by repeating conveyance and stop of the medium M in the conveyance direction A under control of the control unit 5. The liquid ejecting apparatus 1A according to the present embodiment can eject the liquid 3 from the head 2 to the medium M while moving the carriage 4 in the reciprocating direction B during stop of the intermittent conveyance of the medium M performed by the conveyer 9. FIG. 3 shows a state in which the carriage 4 is moved in the reciprocating direction B and the liquid 3 is ejected from the head 2 to the medium M during stop of the intermittent conveyance of the medium M performed by the conveyer 9. With such a configuration, the liquid ejecting apparatus 1A according to the present embodiment can eject the liquid 3 to the medium M that is stopped, and thus ejection accuracy of the liquid 3 can be improved, and the liquid 3 can be particularly uniformly applied to the medium M.

On the other hand, the liquid ejecting apparatus 1A according to the present embodiment can continuously convey the medium M by the conveyer 9 under control of the control unit 5 and eject the liquid 3 from the head 2 to the medium M while moving the carriage 4 in the reciprocating direction B relative to the medium M continuously conveyed by the conveyer 9. Therefore, the liquid ejecting apparatus 1A according to the present embodiment can efficiently apply the liquid 3 to the medium M in a short time.

The liquid ejecting apparatus 1A according to the present embodiment has a configuration allowing heads having various configurations to be used as the head 2. Examples of the head 2 that can be used in the liquid ejecting apparatus 1A according to the present embodiment will be described with reference to FIGS. 4 to 11.

Figure 4:
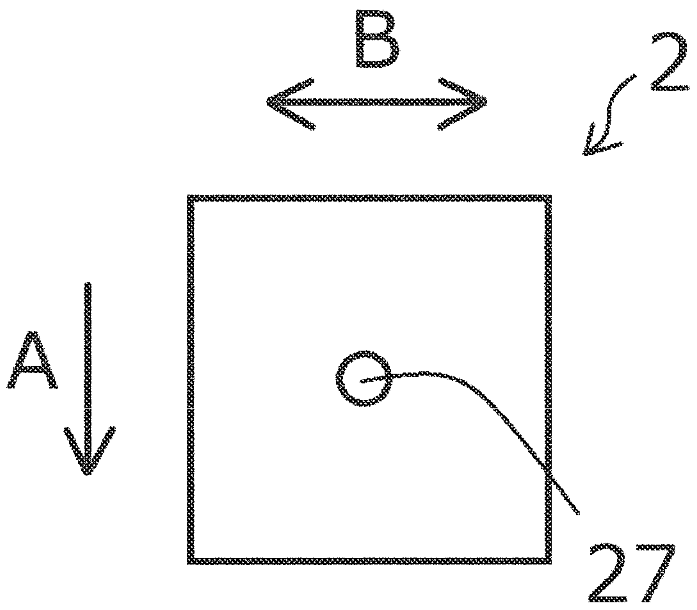
FIG. 4 is a schematic bottom view showing an example of a head usable in the liquid ejecting apparatus in FIG. 1.
Figure 5:
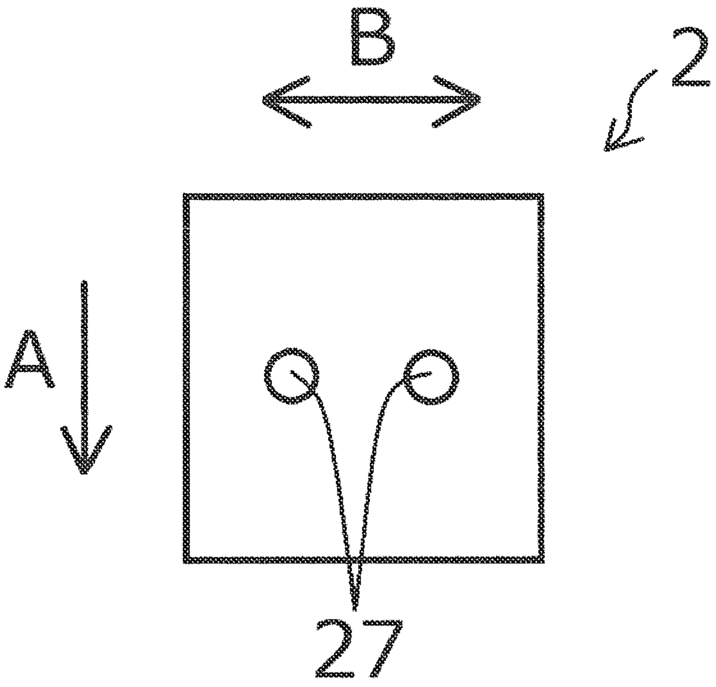
FIG. 5 is a schematic bottom view showing an example of a head usable in the liquid ejecting apparatus in FIG. 1.

First, the head 2 shown in FIG. 4 includes only one nozzle 27. Thus, the head 2 may include only one nozzle 27. However, the head 2 may also include a plurality of nozzles 27. The head 2 shown in FIG. 5 includes two nozzles 27 arranged along the reciprocating direction B. However, three or more nozzles 27 may be provided along the reciprocating direction B.

Figure 6:
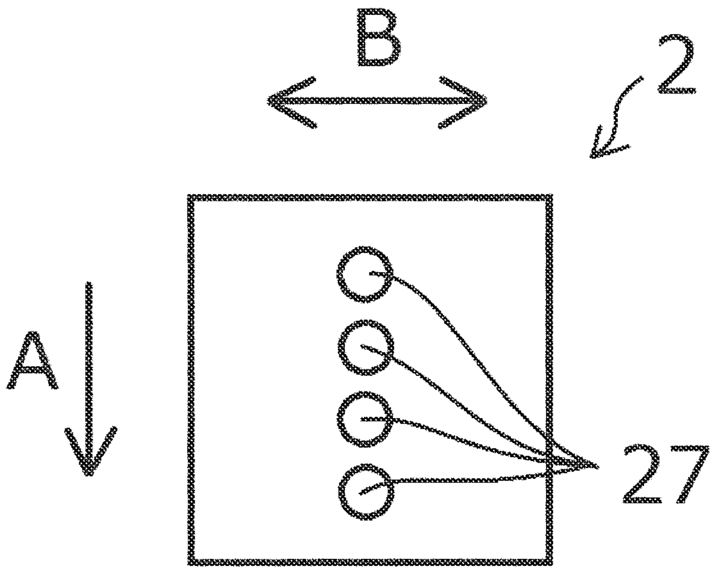
FIG. 6 is a schematic bottom view showing an example of a head usable in the liquid ejecting apparatus in FIG. 1.
Figure 7:
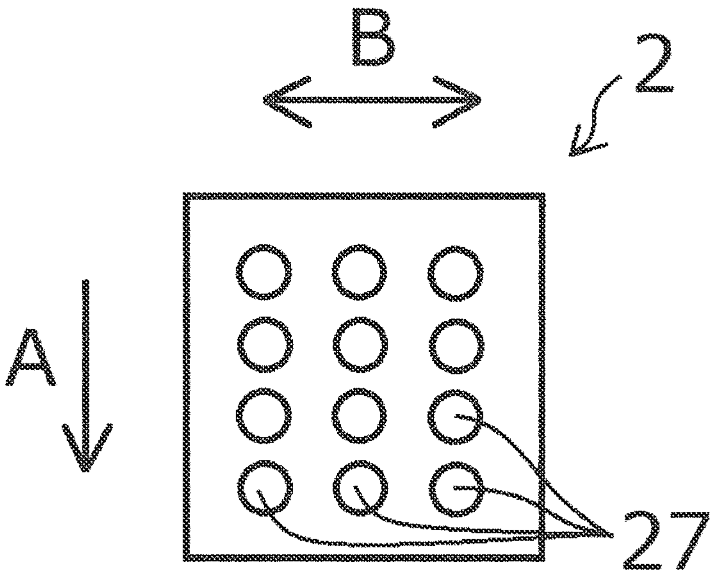
FIG. 7 is a schematic bottom view showing an example of a head usable in the liquid ejecting apparatus in FIG. 1.
Figure 8:
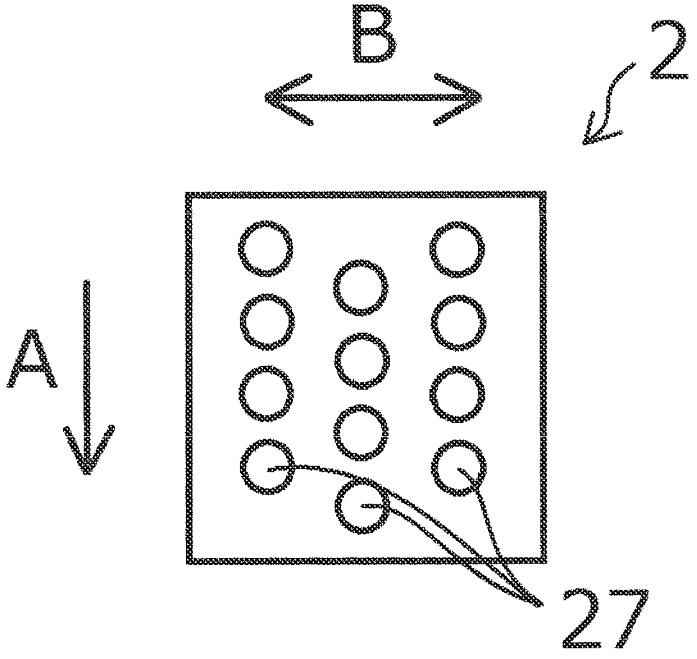
FIG. 8 is a schematic bottom view showing an example of a head usable in the liquid ejecting apparatus in FIG. 1.

The head 2 shown in FIG. 6 includes four nozzles 27 arranged along the conveyance direction A. However, two, three, or five or more nozzles 27 may be arranged along the conveyance direction A. The heads 2 shown in FIGS. 7 and 8 each include three nozzle rows each including a plurality of nozzles 27 arranged along the conveyance direction A. Positions of the nozzles 27 in each nozzle row in the reciprocating direction B may be aligned as in the head 2 shown in FIG. 7, or the positions of the nozzles 27 in each nozzle row may not be aligned in the reciprocating direction B, as in the head 2 shown in FIG. 8.

Thus, according to one preferable aspect, the head 2 includes a nozzle row in which a plurality of nozzles 27 are arranged along the conveyance direction A. With such a configuration, the liquid 3 can be efficiently applied to the medium M.

Figure 9:
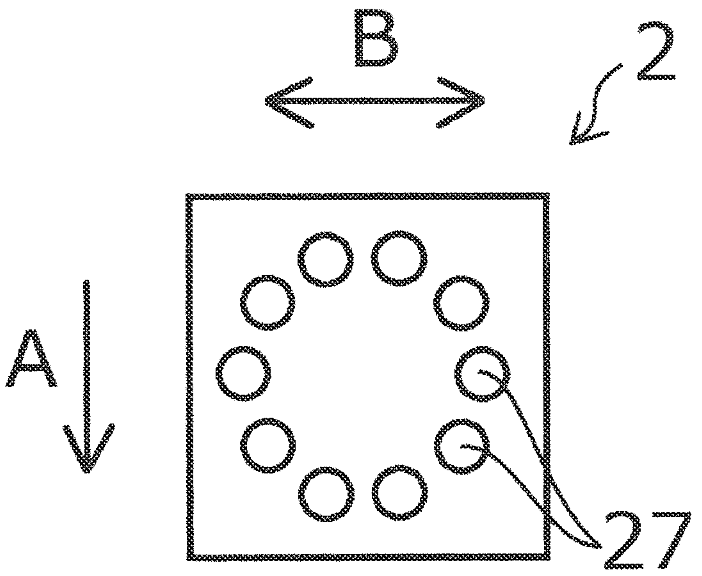
FIG. 9 is a schematic bottom view showing an example of a head usable in the liquid ejecting apparatus in FIG. 1.
Figure 10:
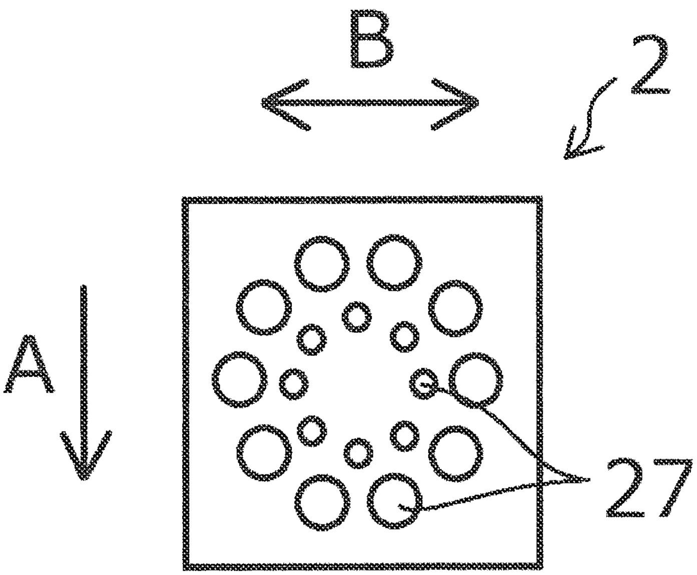
FIG. 10 is a schematic bottom view showing an example of a head usable in the liquid ejecting apparatus in FIG. 1.
Figure 11:
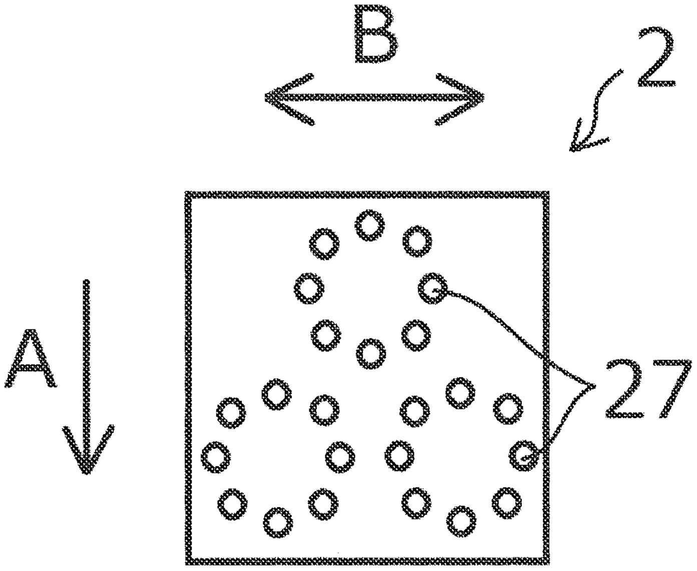
FIG. 11 is a schematic bottom view showing an example of a head usable in the liquid ejecting apparatus in FIG. 1.

In the head 2 shown in each of FIGS. 9, 10, and 11, a plurality of nozzles 27 are arranged in a circular shape. With such a configuration, the liquid 3 can be efficiently applied to the medium M. Here, in the head 2 shown in FIG. 9, a plurality of nozzles 27 are arranged in a single circular shape, and in the head 2 shown in FIG. 10, a plurality of nozzles 27 are concentrically arranged in two circular shapes. In addition, in the head 2 shown in FIG. 11, a plurality of nozzles 27 are arranged in three circular shapes in a nonconcentric manner. Thus, a disposition of the nozzles 27 is not particularly limited. In addition, in the head 2 shown in FIG. 10, each of the nozzles 27 forming an outer circle has a larger inner diameter than each of the nozzles 27 forming an inner circle. Thus, the inner diameter of the nozzle 27 is not particularly limited. In addition, the plurality of nozzles 27 may be disposed, for example, in a polygonal shape instead of a circular shape.

However, the inner diameter of the nozzle 27 is preferably 150 μm or less, regardless of whether there is one or a plurality of nozzles 27. With this configuration, the liquid 3 can be densely applied to the medium M. The inner diameter of the nozzle is preferably 10 μm or more. This is because, by setting the inner diameter of the nozzle to 10 μm or more, the liquid ejected from the nozzle can be effectively prevented from becoming mist.

An ejection speed of the liquid 3 from the head 2 is preferably 10 m/s or more. With this configuration, the liquid 3 can collide with the medium M with high straightness, and the liquid 3 can be applied with high accuracy to a desired position on the medium M. The ejection speed of the liquid 3 from the head 2 is particularly preferably 20 m/s or more. Accordingly, the liquid 3 can be ejected to a particularly accurate position on the medium M. In addition, the ejection speed of the liquid 3 is preferably 160 m/s or less. This is because damage to the medium M can be inhibited by setting the ejection speed of the liquid 3 to 160 m/s or less.

In the liquid ejecting apparatus 1 having the above-described configuration, there is a concern that an amount of the liquid 3 applied to an end of the carriage 4 increases due to deceleration at the end when the carriage 4 moves in the reciprocating direction B. Therefore, in the liquid ejecting apparatus 1A according to the present embodiment, in order to prevent the increase in the application amount of the liquid 3 at the end, it is possible to perform a process of reducing an ejection amount of the liquid 3 from the head 2 at the end under control of the control unit 5. Specifically, in the liquid ejecting apparatus 1A according to the present embodiment, such a process is executed by adjusting a pressure of the pump P.

Second Embodiment

Figure 12:
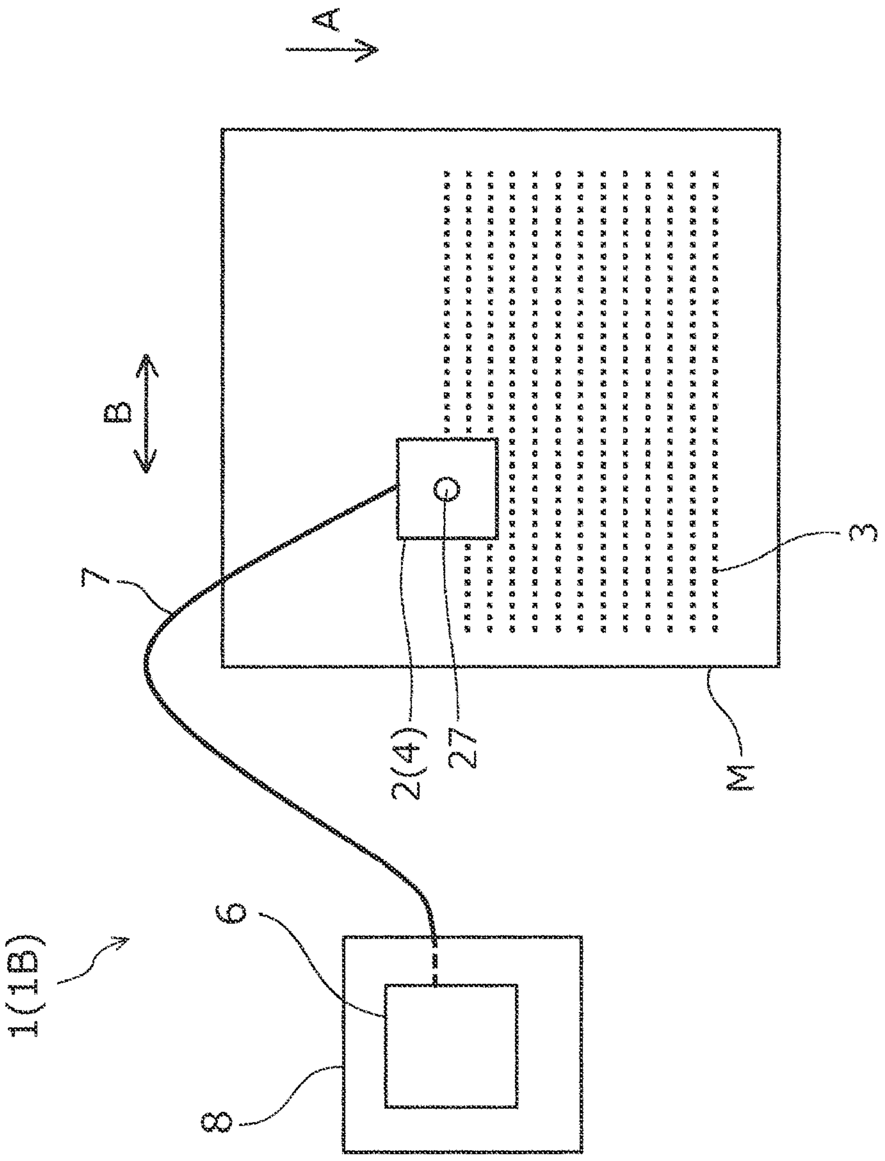
FIG. 12 is a schematic plan view showing a state in which liquid is ejected to a medium conveyed using a liquid ejecting apparatus according to a second embodiment.

Hereinafter, a liquid ejecting apparatus 1B according to a second embodiment will be described with reference to FIG. 12. FIG. 12 is a diagram corresponding to FIG. 3 showing the liquid ejecting apparatus 1A according to the first embodiment. The liquid ejecting apparatus 1B according to the present embodiment is the same as the liquid ejecting apparatus 1A according to the first embodiment except for a configuration to be described later. Therefore, the liquid ejecting apparatus 1B according to the present embodiment has the same features as the liquid ejecting apparatus 1A according to the first embodiment except for those to be described later. In FIG. 12, the same elements as those in the first embodiment are denoted by the same reference numerals, and detailed description thereof is omitted.

As shown in FIG. 3, in the liquid ejecting apparatus 1A according to the first embodiment, the liquid sending portion 6 is the pump P. On the other hand, as shown in FIG. 12, in the liquid ejecting apparatus 1B according to the present embodiment, the liquid sending portion 6 includes a compressible bag-shaped liquid storage 8 therein and can apply a pressure to the inside of the liquid sending portion 6. Thus, the liquid sending portion 6 may have a configuration other than the pump P.

In the liquid ejecting apparatus 1B according to the present embodiment, the liquid sending portion 6 includes the compressible bag-shaped liquid storage 8 therein, and the liquid storage 8 and the liquid sending portion 6 may also be integrally implemented by a pressure container or the like. In addition, the liquid conveyance pipe 7 coupling the liquid sending portion 6 to the head 2 may be coupled to a lower surface of the pressure container, or may be disposed in the pressure container from above in contact with the lower surface of the pressure container.

Third Embodiment

Figure 13:
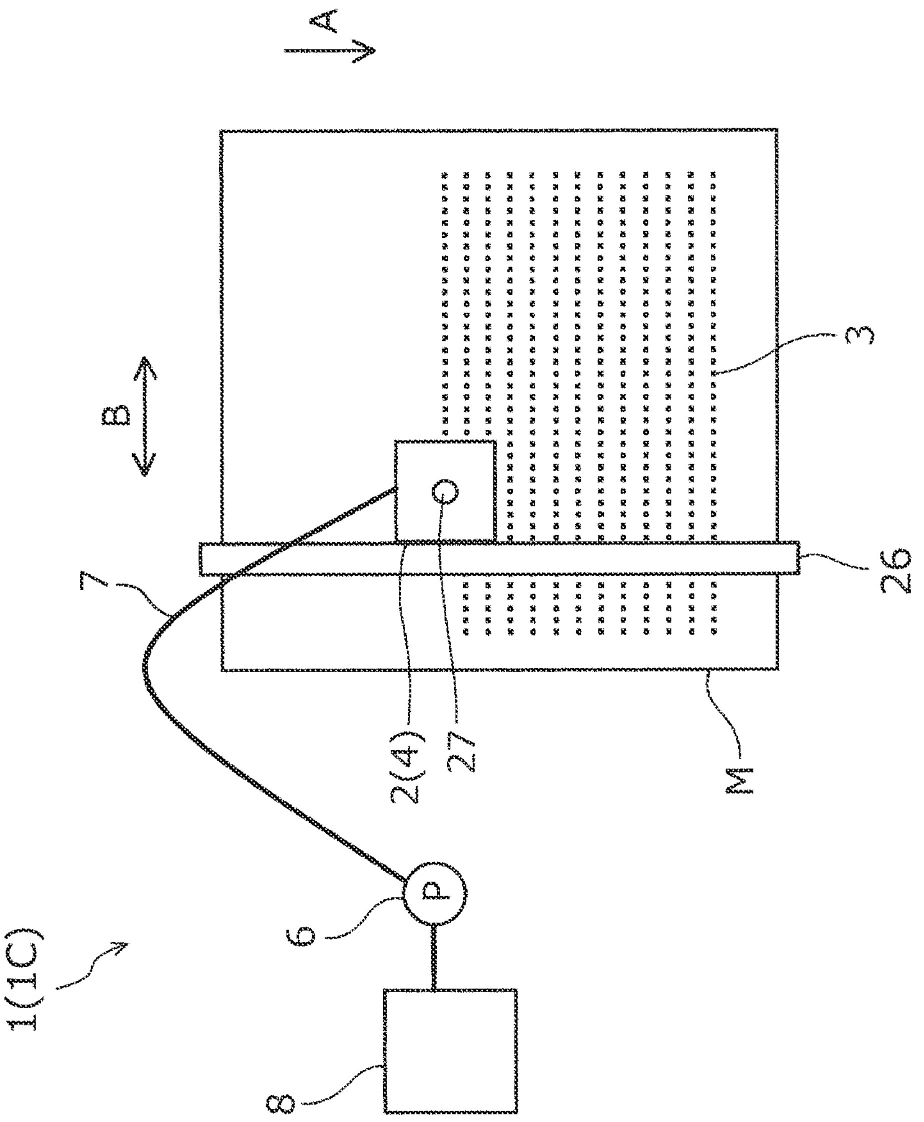
FIG. 13 is a schematic plan view showing a state in which liquid is ejected to a medium conveyed using a liquid ejecting apparatus according to a third embodiment.

Hereinafter, a liquid ejecting apparatus 1C according to a third embodiment will be described with reference to FIG. 13. FIG. 13 is a diagram corresponding to FIG. 3 showing the liquid ejecting apparatus 1A according to the first embodiment. The liquid ejecting apparatus 1C according to the present embodiment is the same as the liquid ejecting apparatus 1 according to each of the first embodiment and the second embodiment except for a configuration to be described later. Therefore, the liquid ejecting apparatus 1C according to the present embodiment has the same features as the liquid ejecting apparatus 1 according to each of the first embodiment and the second embodiment except for those to be described later. In FIG. 13, the same elements as those in the first embodiment and the second embodiment are denoted by the same reference numerals, and detailed description thereof is omitted.

As shown in FIG. 13, the liquid ejecting apparatus 1C according to the present embodiment includes a carriage moving shaft 26 that can move the carriage 4 along the conveyance direction A. The carriage 4 is movable in the reciprocating direction B together with the carriage moving shaft 26. With such a configuration, the liquid ejecting apparatus 1C according to the present embodiment can eject the liquid 3 to the medium M from various dispositions, and the liquid 3 can be particularly uniformly applied to the medium M.

The liquid ejecting apparatus 1C according to the present embodiment can also continuously convey the medium M by the conveyer 9 under control of the control unit 5 and eject the liquid 3 from the head 2 to the medium M while moving the carriage 4 in the reciprocating direction B relative to the medium M continuously conveyed by the conveyer 9. In this case, the carriage 4 can be moved in the conveyance direction A along the carriage moving shaft 26 according to a conveyance speed of the medium M conveyed in the conveyance direction A by the conveyer 9. In this way, the liquid 3 can be evenly ejected to the medium M.

The liquid ejecting apparatus 1C according to the present embodiment can intermittently convey the medium M by repeating conveyance and stop of the medium M in the conveyance direction A under control of the control unit 5 and can eject the liquid 3 from the head 2 to the medium M while moving the carriage 4 in the reciprocating direction B during stop of intermittent conveyance of the medium M performed by the conveyer 9. Further, the liquid ejecting apparatus 1C according to the present embodiment can eject the liquid 3 to the medium M by repeating, under control of the control unit 5, stopping the intermittent conveyance of the medium M for a while, moving the carriage 4 in the conveyance direction A along the carriage moving shaft 26, and ejecting the liquid 3 from the head 2 to the medium M while moving the carriage 4 in the reciprocating direction B. In this way, the liquid 3 can also be evenly ejected to the medium M.

The liquid ejecting apparatus 1C according to the present embodiment can also use the head 2 having each configuration shown in FIGS. 4 to 11. Here, for example, in a case where the head 2 in FIG. 6 is used among the heads 2 having the respective configurations in FIGS. 4 to 11, it is possible to make a length-before-contact of the liquid 3 ejected from the nozzle row in the conveyance direction A larger than a conveyance distance in the conveyance direction A of the medium M that is conveyed along with one movement of the carriage 4 in the reciprocating direction.

Therefore, in the liquid ejecting apparatus 1C according to the present embodiment, since an amount of movement of the medium M conveyed by the conveyer 9 is larger than the length-before-contact of the liquid 3, it is possible to inhibit generation of a portion where the liquid 3 is not applied between a range of application by a movement of the carriage 4 in a forward direction and a range of application by a movement in a backward direction. In the liquid ejecting apparatus 1C according to the present embodiment, a length of the nozzle row in the conveyance direction A is substantially the same as the length-before-contact of the liquid 3 and can be substantially the same as or substantially an integral multiple of the conveyance distance in the conveyance direction A of the medium M conveyed along with one movement of the carriage 4 in the reciprocating direction B. In this way, it is also possible to inhibit unevenness caused by a portion where a doubled amount of the liquid 3 is applied between the range of application by the movement of the carriage 4 in the forward direction and the range of application by the movement of the carriage 4 in the backward direction, for example (a portion where the liquid 3 is repeatedly applied when the carriage 4 moves in the forward direction and when the carriage 4 moves in the backward direction).

Fourth Embodiment

Figure 14:
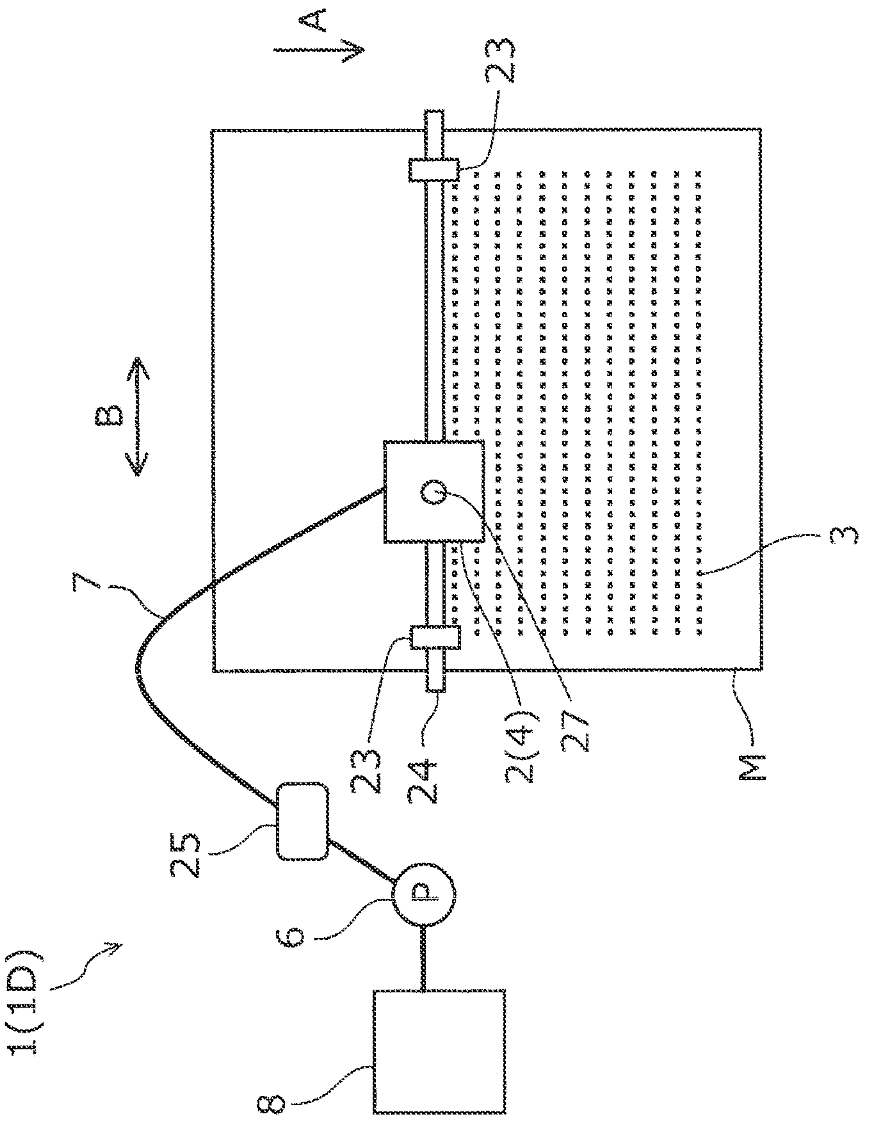
FIG. 14 is a schematic plan view showing a state in which liquid is ejected to a medium conveyed using a liquid ejecting apparatus according to a fourth embodiment.

Hereinafter, a liquid ejecting apparatus 1D according to a fourth embodiment will be described with reference to FIG. 14. FIG. 14 is a diagram corresponding to FIG. 3 showing the liquid ejecting apparatus 1A according to the first embodiment. The liquid ejecting apparatus 1D according to the present embodiment is the same as the liquid ejecting apparatus 1 according to each of the first embodiment to the third embodiment except for a configuration to be described later. Therefore, the liquid ejecting apparatus 1D according to the present embodiment has the same features as the liquid ejecting apparatuses 1 according to the first embodiment to the third embodiment except for those to be described later. In FIG. 14, the same elements as those in the first embodiment to the third embodiment are denoted by the same reference numerals, and detailed description thereof is omitted.

Here, in the liquid ejecting apparatus 1 according to each of the first embodiment to the third embodiment, in order to prevent the increase in the application amount of the liquid 3 at the end of the carriage 4 due to deceleration at the end when moving in the reciprocating direction B, it is possible to perform a process of reducing the ejection amount of the liquid 3 from the head 2 at the end under control of the control unit 5. This is implemented, for example, by adjusting the pressure of the pump P. On the other hand, as shown in FIG. 14, the liquid ejecting apparatus 1D according to the present embodiment is provided with a two-way valve 25 that is an electromagnetic valve, a detection unit 23 of the carriage 4 is provided at both ends of a moving shaft 24 in the reciprocating direction B of the carriage 4, and opening and closing control of the two-way valve 25 can be performed by control of the control unit 5 when the detection unit 23 detects the carriage 4. In the present embodiment, opening and closing of the two-way valve 25 are controlled electrically by the control unit 5, and the two-way valve 25 may also be opened and closed mechanically in conjunction with the detection of the carriage 4 performed by the detection unit 23.

Fifth Embodiment

Figure 15:
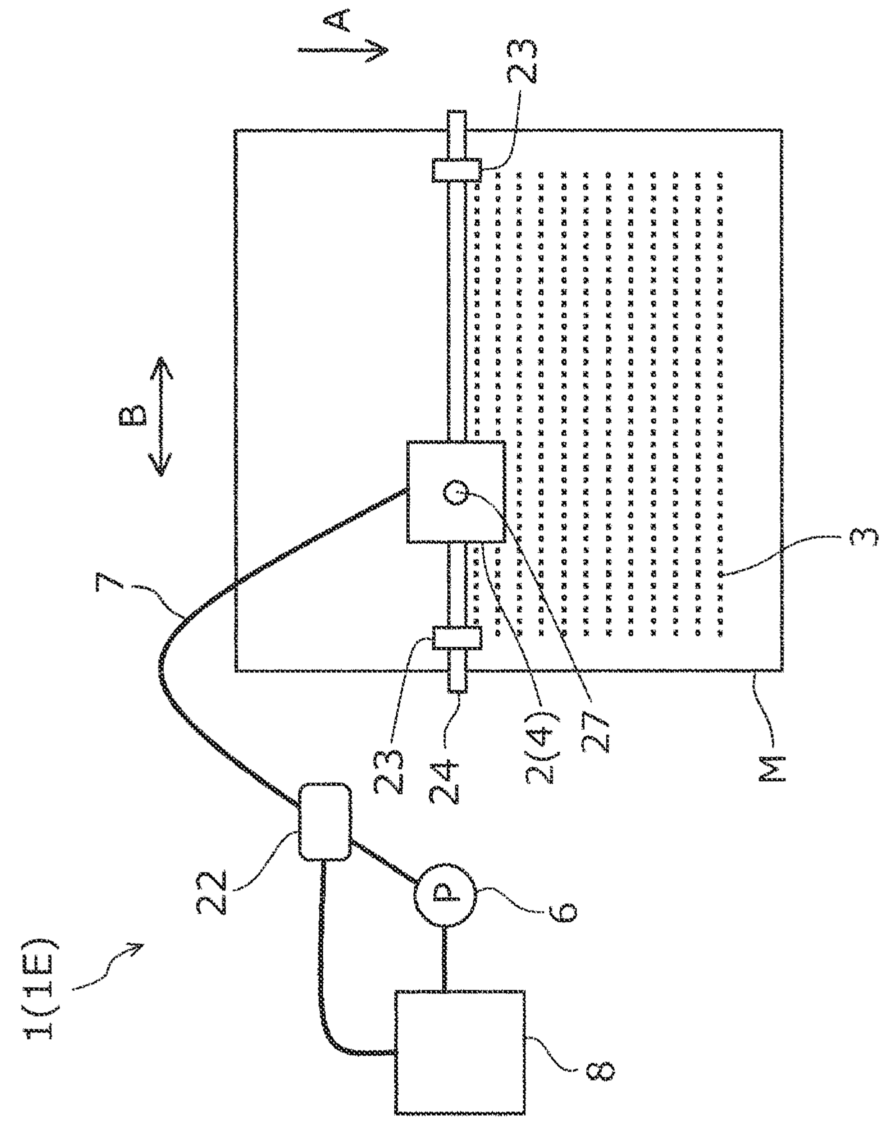
FIG. 15 is a schematic plan view showing a state in which liquid is ejected to a medium conveyed using a liquid ejecting apparatus according to a fifth embodiment.

Hereinafter, a liquid ejecting apparatus 1E according to a fifth embodiment will be described with reference to FIG. 15. FIG. 15 is a diagram corresponding to FIG. 3 showing the liquid ejecting apparatus 1A according to the first embodiment. The liquid ejecting apparatus 1E according to the present embodiment is the same as the liquid ejecting apparatus 1 according to each of the first embodiment to the fourth embodiment except for a configuration to be described later. Therefore, the liquid ejecting apparatus 1E according to the present embodiment has the same features as the liquid ejecting apparatus 1 according to each of the first embodiment to the fourth embodiment except for those to be described later. In FIG. 15, the same elements as those in the first embodiment to the fourth embodiment are denoted by the same reference numerals, and detailed description thereof is omitted.

As shown in FIG. 14, the liquid ejecting apparatus 1D according to the fourth embodiment includes the two-way valve 25, which is an electromagnetic valve, and can perform the opening and closing control of the two-way valve 25 under control of the control unit 5 when the detection unit 23 detects the carriage 4. On the other hand, as shown in FIG. 15, the liquid ejecting apparatus 1E according to the present embodiment includes, instead of the two-way valve 25, a three-way valve 22 whose one end is coupled to the liquid storage 8. The three-way valve 22 in the present embodiment is configured such that a passage from the liquid storage 8 to the head 2 is opened by energization, and may also be configured such that the passage from the liquid storage 8 to the head 2 is closed by energization.

Sixth Embodiment

Figure 16:
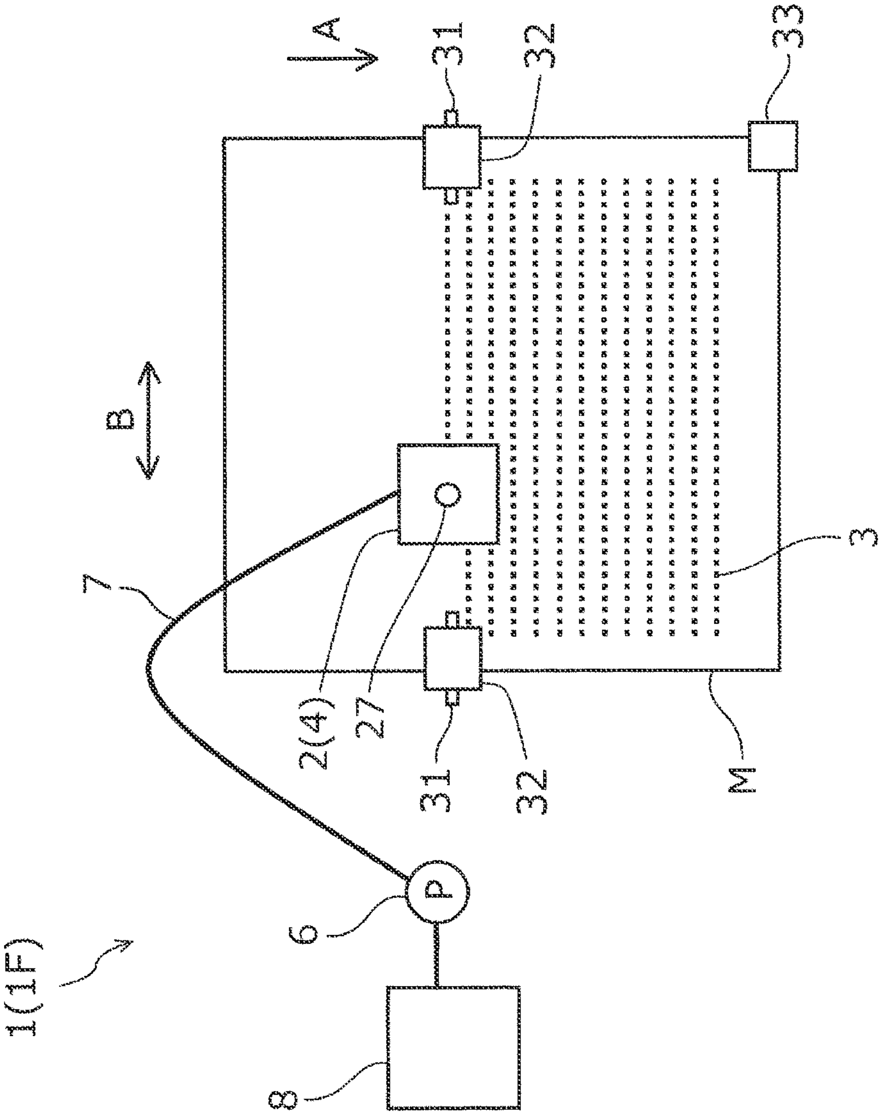
FIG. 16 is a schematic plan view showing a state in which liquid is ejected to a medium conveyed using a liquid ejecting apparatus according to a sixth embodiment.

Hereinafter, a liquid ejecting apparatus 1F according to a sixth embodiment will be described with reference to FIG. 16. FIG. 16 is a diagram corresponding to FIG. 3 showing the liquid ejecting apparatus 1A according to the first embodiment. The liquid ejecting apparatus 1F according to the present embodiment is the same as the liquid ejecting apparatus 1 according to each of the first embodiment to the fifth embodiment except for a configuration to be described later. Therefore, the liquid ejecting apparatus 1F according to the present embodiment has the same features as the liquid ejecting apparatus 1 according to each of the first embodiment to the fifth embodiment except for those to be described later. In FIG. 16, the same elements as those in the first embodiment to the fifth embodiment are denoted by the same reference numerals, and detailed description thereof is omitted.

As shown in FIG. 16, the liquid ejecting apparatus 1F according to the present embodiment includes a medium detection unit 33 that can detect the medium M, a mask 32 that can adjust an amount of the liquid 3 ejected from the head 2, and a mask position adjustment shaft 31 that can adjust a position of the mask 32. In the liquid ejecting apparatus 1F according to the present embodiment, the position of the mask 32 is adjusted based on a detection result of the medium detection unit 33 under control of the control unit 5, and thus it is possible to prevent the increase in the application amount of the liquid 3 at the end in the reciprocating direction B. In the liquid ejecting apparatus 1F according to the present embodiment, the liquid 3 adhering to the mask 32 can return to the liquid storage 8 through a tube (not shown), and the liquid 3 adhering to the mask 32 may also be absorbed by an absorber or the like.

Seventh Embodiment

Figure 17:
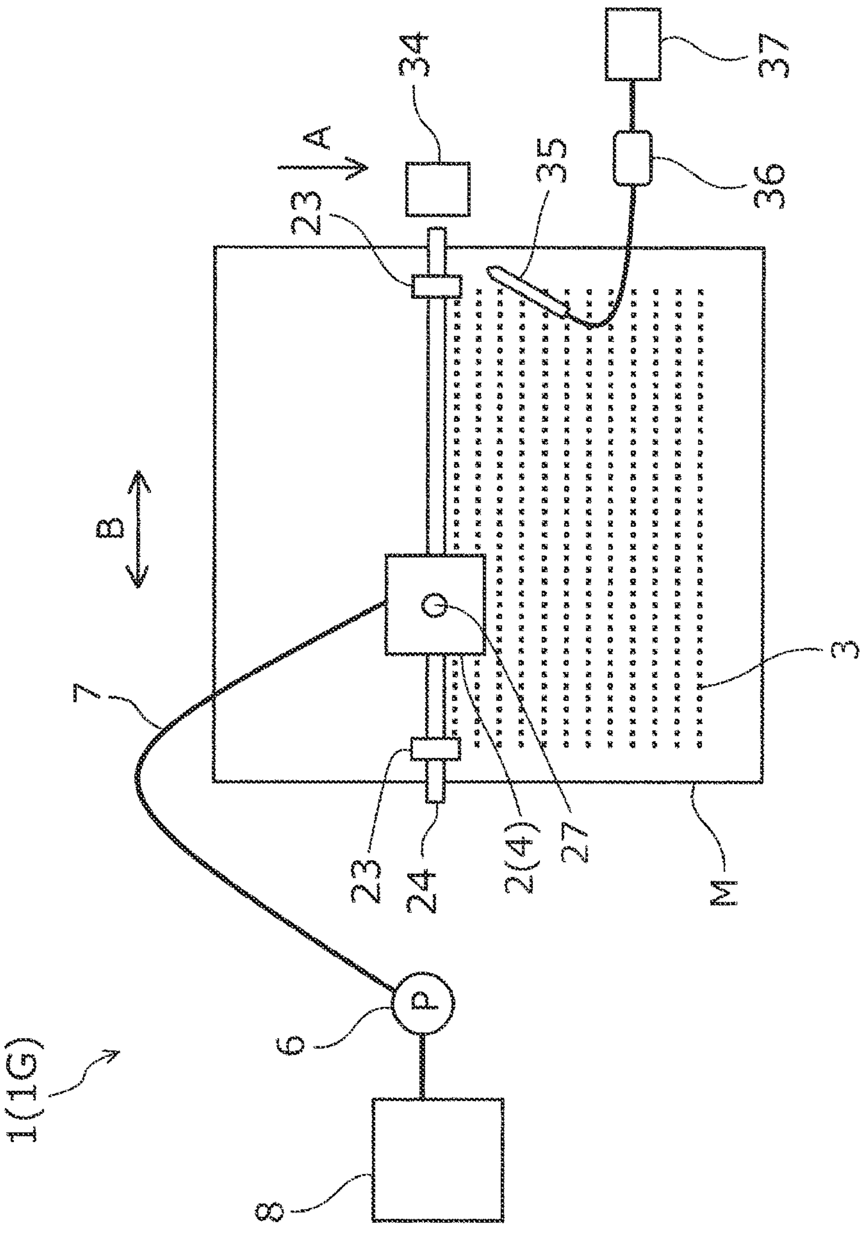
FIG. 17 is a schematic plan view showing a state in which liquid is ejected to a medium conveyed using a liquid ejecting apparatus according to a seventh embodiment.

Hereinafter, a liquid ejecting apparatus 1G according to a seventh embodiment will be described with reference to FIG. 17. FIG. 17 is a diagram corresponding to FIG. 3 showing the liquid ejecting apparatus 1A according to the first embodiment. The liquid ejecting apparatus 1G according to the present embodiment is the same as the liquid ejecting apparatus 1 according to each of the first embodiment to the sixth embodiment except for a configuration to be described later. Therefore, the liquid ejecting apparatus 1G according to the present embodiment has the same features as the liquid ejecting apparatus 1 according to each of the first embodiment to the sixth embodiment except for those to be described later. In FIG. 17, the same elements as those in the first embodiment to the sixth embodiment are denoted by the same reference numerals, and detailed description thereof is omitted.

As shown in FIG. 17, the liquid ejecting apparatus 1G according to the present embodiment includes the detection unit 23 of the carriage 4 at both ends of the moving shaft 24 in the reciprocating direction B of the carriage 4. Further, the liquid ejecting apparatus 1G according to the present embodiment includes an air blowing unit 37 such as a compressor that can blow air, a two-way valve 36, which is an electromagnetic valve, and an air ejection unit 35. Here, opening and closing of the two-way valve 36 and on and off of driving of the air blowing unit 37 are controlled by the control unit 5, and, when the carriage 4 is detected by the detection unit 23, air is ejected from the air ejection unit 35 to inhibit the increase in the application amount of the liquid 3 at the end in the reciprocating direction B.

The liquid ejecting apparatus 1G according to the present embodiment includes a collection unit 34 that collects the liquid 3 that is scattered due to air ejection from the air ejection unit 35. Here, in the liquid ejecting apparatus 1G according to the present embodiment, the liquid 3 collected by the collection unit 34 can return to the liquid storage 8 via a tube (not shown).

Eighth Embodiment

Figure 18:
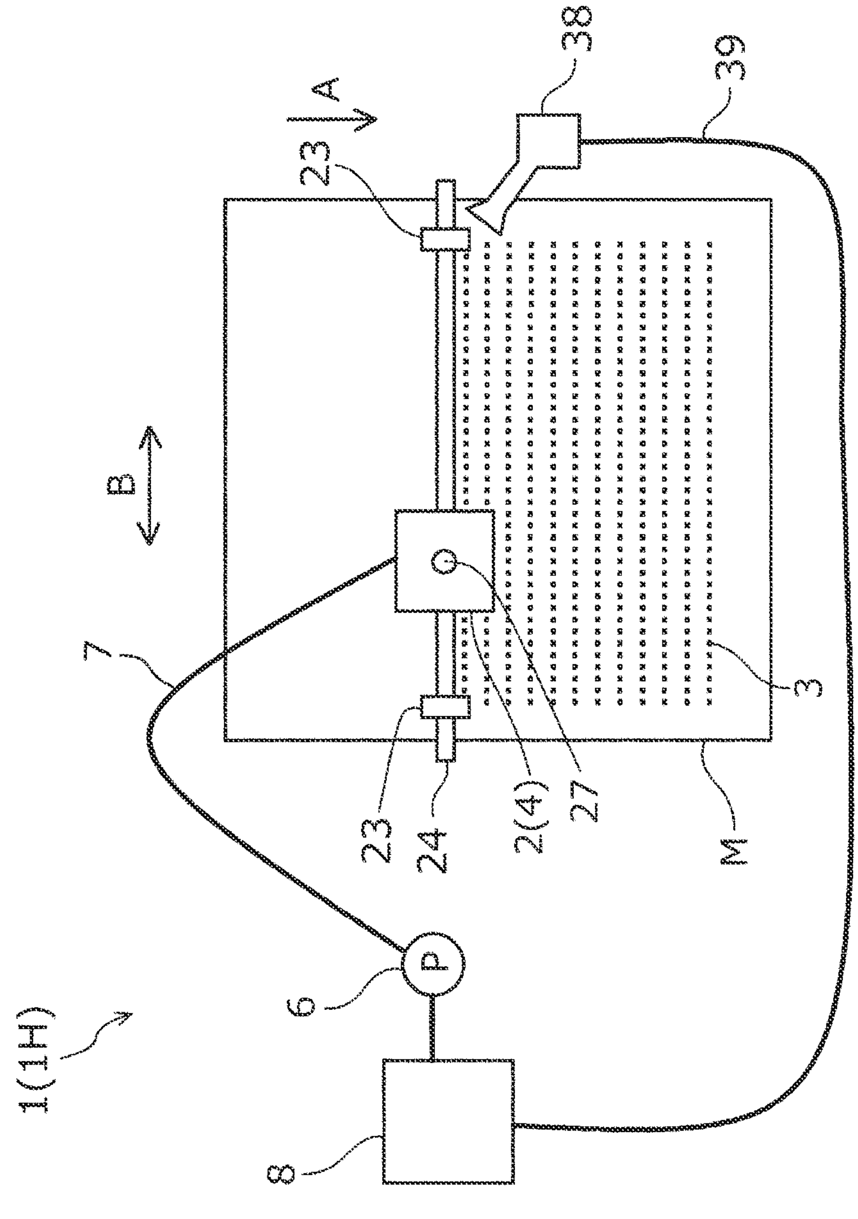
FIG. 18 is a schematic plan view showing a state in which liquid is ejected to a medium conveyed using a liquid ejecting apparatus according to an eighth embodiment.

Hereinafter, a liquid ejecting apparatus 1H according to an eighth embodiment will be described with reference to FIG. 18. FIG. 18 is a diagram corresponding to FIG. 3 showing the liquid ejecting apparatus 1A according to the first embodiment. The liquid ejecting apparatus 1H according to the present embodiment is the same as the liquid ejecting apparatus 1 according to each of the first embodiment to the seventh embodiment except for a configuration to be described later. Therefore, the liquid ejecting apparatus 1H according to the present embodiment has the same features as the liquid ejecting apparatus 1 according to each of the first embodiment to the seventh embodiment except for those to be described later. In FIG. 18, the same elements as those in the first embodiment to the seventh embodiment are denoted by the same reference numerals, and detailed description thereof is omitted.

As shown in FIG. 18, the liquid ejecting apparatus 1H according to the present embodiment includes the detection unit 23 of the carriage 4 at both ends of the moving shaft 24 in the reciprocating direction B of the carriage 4. Further, the liquid ejecting apparatus 1H according to the present embodiment includes an electrostatic attraction device 38 that can electrostatically attract a part of the liquid 3 ejected from the head 2. Here, on and off of driving of the electrostatic attraction device 38 is controlled by the control unit 5, and, when the carriage 4 is detected by the detection unit 23, the electrostatic attraction device 38 is turned on to prevent the increase in the application amount of the liquid 3 at the end in the reciprocating direction B. In the liquid ejecting apparatus 1H according to the present embodiment, the liquid 3 collected by the electrostatic attraction device 38 can return to the liquid storage 8 through a tube 39.

Ninth Embodiment

Figure 19:
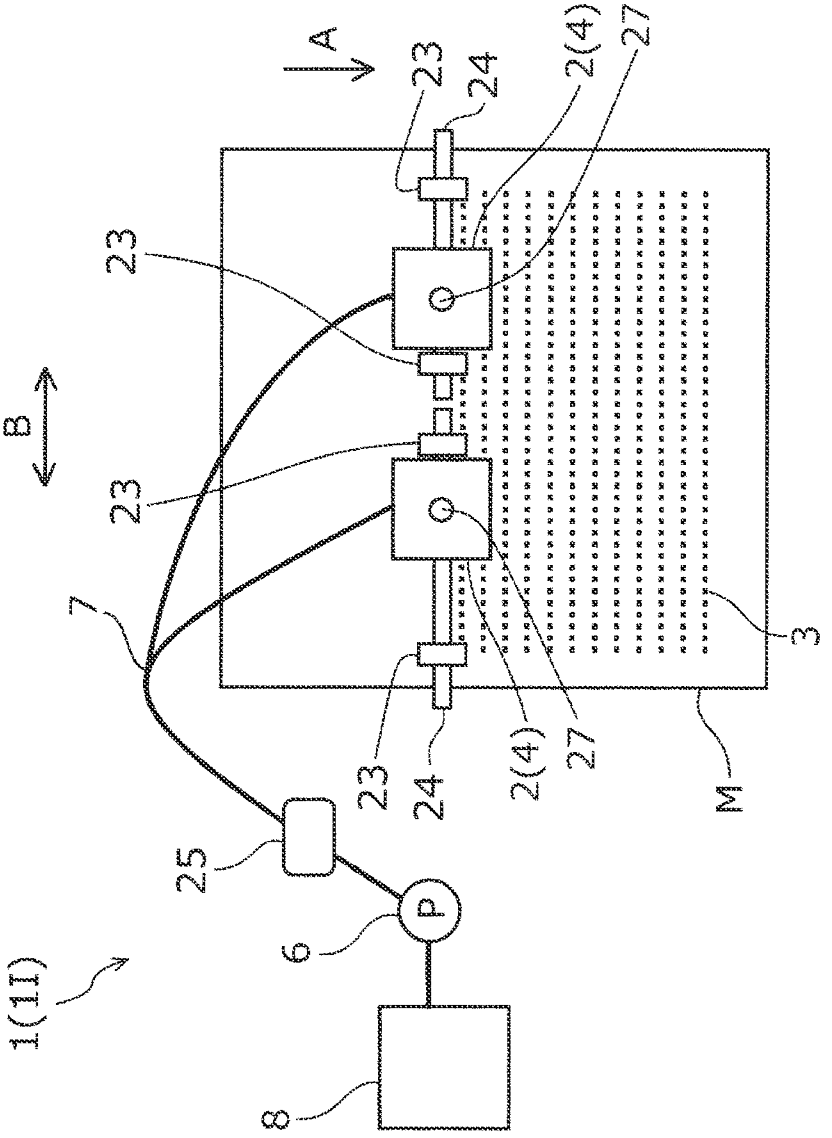
FIG. 19 is a schematic plan view showing a state in which liquid is ejected to a medium conveyed using a liquid ejecting apparatus according to a ninth embodiment.

Hereinafter, a liquid ejecting apparatus 1I according to a ninth embodiment will be described with reference to FIG. 19. FIG. 19 is a diagram corresponding to FIG. 3 showing the liquid ejecting apparatus 1A according to the first embodiment. The liquid ejecting apparatus 1I according to the present embodiment is the same as the liquid ejecting apparatus 1 according to each of the first embodiment to the eighth embodiment except for a configuration to be described later. Therefore, the liquid ejecting apparatus 1I according to the present embodiment has the same features as the liquid ejecting apparatus 1 according to each of the first embodiment to the eighth embodiment except for those to be described later. In FIG. 19, the same elements as those in the first embodiment to the eighth embodiment are denoted by the same reference numerals, and detailed description thereof is omitted.

As described above, the liquid ejecting apparatus 1 according to each of the first embodiment to the eighth embodiment includes one carriage 4. On the other hand, as shown in FIG. 19, the liquid ejecting apparatus 1I according to the present embodiment includes two carriages 4. Thus, a plurality of carriages 4 may be provided. In the liquid ejecting apparatus 1I according to the present embodiment, the two carriages 4 movable in the reciprocating direction B orthogonal to the conveyance direction A are arranged along the reciprocating direction B, but the present disclosure is not limited to such a configuration. For example, three or more carriages 4 movable in the reciprocating direction B orthogonal to the conveyance direction A may be arranged in a staggered manner. In addition, for example, a plurality of carriages 4 having the reciprocating direction B inclined with respect to a direction orthogonal to the conveyance direction A may be provided.

The liquid ejecting apparatus 1I according to the present embodiment includes two carriages 4 that can eject the same liquid 3 from the head 2, and may also include a plurality of carriages 4 that can eject different types of liquid 3 from the head 2. Further, heads 2 having different shapes may be mounted on the plurality of carriages 4.

The present disclosure is not limited to the above-described embodiments, and can be implemented by various configurations without departing from the gist of the present disclosure. For example, the liquid 3 may not be applied to fabric, and for example, the carriage 4 may be attached to a tip of a robot arm such that the liquid 3 can be applied not only to a flat surface but also to a curved surface. In addition, technical features in the embodiments corresponding to technical features in the aspects described in the summary can be replaced or combined as appropriate in order to solve a part or all of the above-described problems or in order to obtain a part or all of the above-described effects. In addition, unless the technical features are described as being essential in the present description, the technical features can be appropriately deleted.

What is claimed is:

1. A liquid ejecting apparatus comprising:

a conveyer configured to convey a medium in a conveyance direction;

a carriage configured to move in a reciprocating direction intersecting the conveyance direction at a position facing the medium conveyed in the conveyance direction; and a head provided on the carriage and including at least one nozzle configured to eject liquid to the medium, wherein the head ejects the liquid in a continuous flow, converts the continuous flow into a plurality of droplets, and causes the plurality of droplets to collide with the medium.

2. The liquid ejecting apparatus according to claim 1, further comprising:

a liquid storage configured to store the liquid; and a pump configured to send the liquid from the liquid storage to the head.

3. The liquid ejecting apparatus according to claim 1, wherein the carriage is moved in the reciprocating direction relative to the medium conveyed by the conveyer while the liquid is ejected from the head to the medium.

4. The liquid ejecting apparatus according to claim 1, wherein the conveyer is configured to intermittently convey the medium by repeating conveyance and stop of the medium, and the carriage is moved in the reciprocating direction while the liquid is ejected from the head to the medium during stop of intermittent conveyance of the medium.

5. The liquid ejecting apparatus according to claim 1, further comprising:

a carriage moving shaft configured to move the carriage along the conveyance direction, wherein the carriage is configured to be movable in the reciprocating direction together with the carriage moving shaft.

6. The liquid ejecting apparatus according to claim 1, wherein the head includes a nozzle row in which a plurality of the nozzles are arranged along the conveyance direction.

7. The liquid ejecting apparatus according to claim 6, wherein the carriage is moved in the reciprocating direction relative to the medium conveyed by the conveyer while the liquid is ejected from the head to the medium, and a length of a region where the liquid landed in the medium in the conveyance direction is larger than a conveyance distance in the conveyance direction of the medium that is conveyed along with one movement of the carriage in the reciprocating direction.

8. The liquid ejecting apparatus according to claim 1, wherein the plurality of nozzles is disposed in a circular shape in the head.

9. The liquid ejecting apparatus according to claim 1, wherein an inner diameter of the nozzle is 150 μm or less.

10. The liquid ejecting apparatus according to claim 1, wherein an ejection speed of the liquid from the head is 10 m/s or more.

* * * * *